United States Patent [19]

Tingley

[11] Patent Number: 4,684,145
[45] Date of Patent: Aug. 4, 1987

[54] BOAT GUIDE

[76] Inventor: William C. Tingley, 910 S. Louisville, Tulsa, Okla. 74112

[21] Appl. No.: 772,033

[22] Filed: Sep. 3, 1985

[51] Int. Cl.⁴ .............................................. B60P 3/10
[52] U.S. Cl. ............................... 280/414.1; 114/344; 414/534
[58] Field of Search .......................... 280/414.1, 414.3; 414/532, 533, 534, 531, 535, 538, 559; 114/344

[56] References Cited

U.S. PATENT DOCUMENTS

| | | | |
|---|---|---|---|
| 2,827,304 | 3/1958 | Backus | 280/414.1 X |
| 2,933,328 | 4/1960 | McIntyre et al. | 280/414.1 X |
| 3,012,795 | 12/1961 | Doerfler | 280/414.1 X |
| 3,026,981 | 3/1962 | Youtie | 414/534 X |
| 3,204,790 | 9/1965 | Collins | 414/534 |
| 3,390,796 | 7/1968 | Theobald | 280/414.1 X |
| 3,447,815 | 6/1969 | West | 280/414.1 X |
| 3,974,924 | 8/1976 | Ullman, Jr. | 280/414.1 X |
| 4,221,420 | 9/1980 | Vencill et al. | 280/414.1 X |
| 4,318,632 | 3/1982 | Fortmeyer | 280/414.1 X |

Primary Examiner—John J. Love
Assistant Examiner—Charles R. Watts
Attorney, Agent, or Firm—Head, Johnson & Stevenson

[57] ABSTRACT

A boat guide for use in loading a boat from a body of water onto a trailer. There is one upright post on each side of the boat trailer near the rear end thereof each of which is of sufficient height to extend above the water when loading the boat. A cross-member having a cradle in the center connects the upper ends of these two posts. The posts are each pivotally connected to the floor or frame of the trailer and are held by a spring in an upright position. When the boat is to be loaded, the keel of the boat is directed toward the cradle and as the boat moves over the trailer, the guide rotates but the keel still follows the cradle.

12 Claims, 8 Drawing Figures

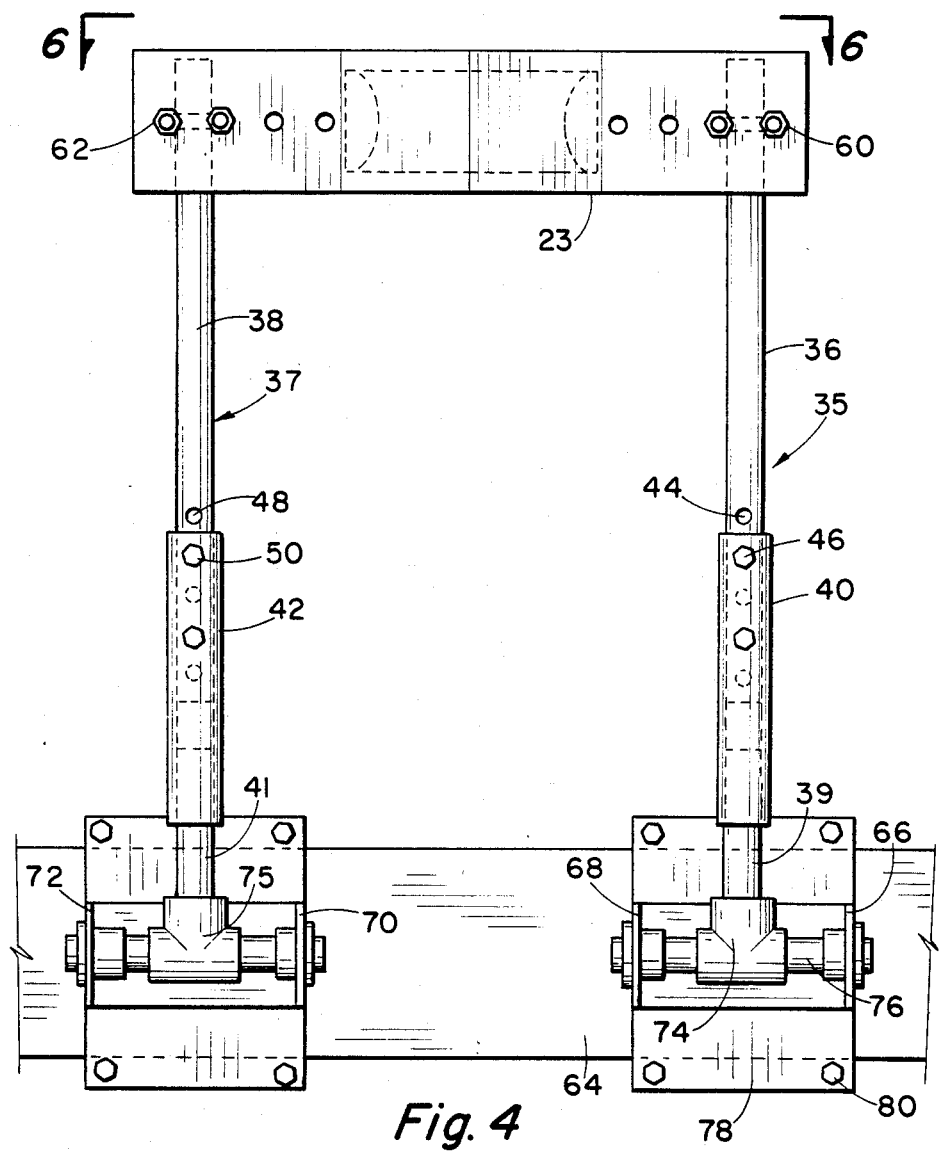

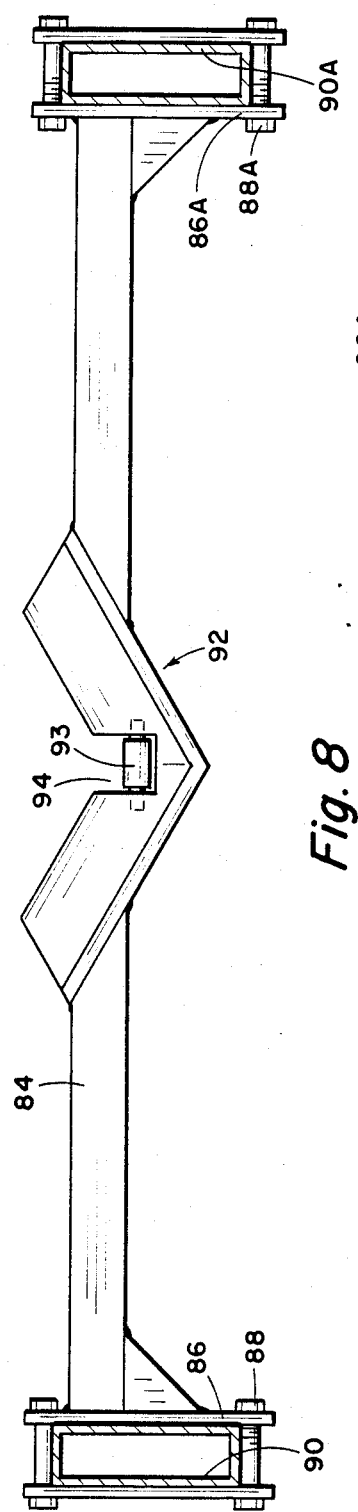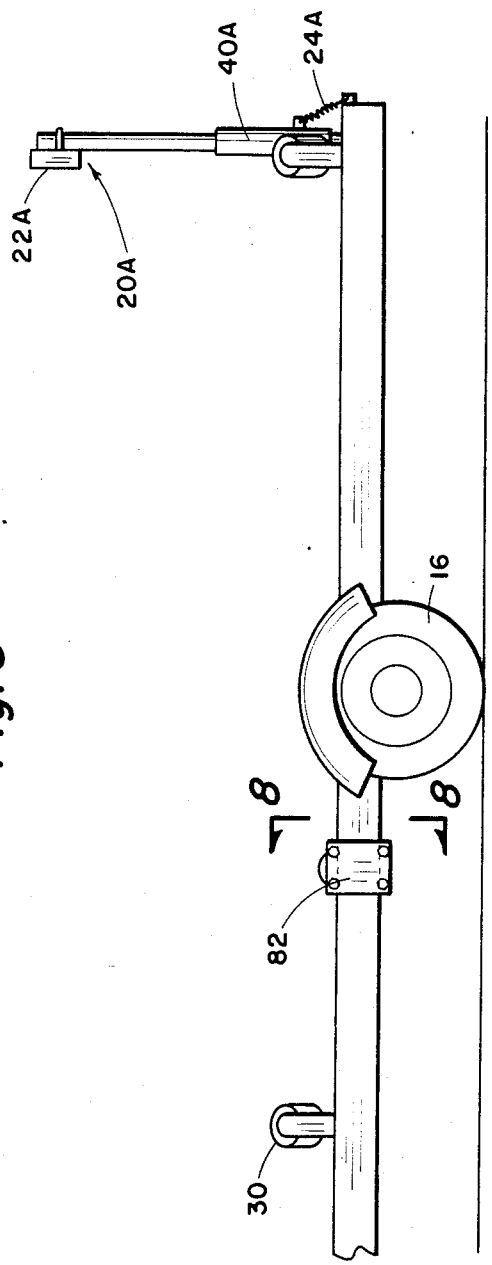
Fig. 8
Fig. 7

BOAT GUIDE

BACKGROUND OF THE INVENTION

This invention relates to a special guide for guiding a boat onto a trailer which is on a ramp leading into the water.

One of the largest past times in this country is the wide uses of boats on our streams and lakes. A very large number of boats are owned by people who keep the boats at their home on land and haul them by trailer to a lake or to the stream. The trailer with the boat on it is usually backed down a ramp into the water so that the trailer is partially submerged and the boat floated out to the deeper water. There is really no big problem with this. However, after the boaters have finished their lake activities, such as fishing, skiing or sightseeing, they must load the boat back on the trailer. It is necessary that the boat be directed to the center part of the trailer so that it will be properly positioned on the trailer for the trip back home. This can be a problem especially if there is high winds or waves which might force the boat to go off course.

Various means and methods have been devised to meet the problem of centering the boat just described. A search in this area revealed the following U.S. Pat. Nos. 3,447,815; 3,750,805; 4,268,211; 4,010,962; 2,827,304; 3,822,899; 3,021,969; 4,209,279; 4,448,438; 3,603,465; and 3,938,829.

Most of these patents are directed toward some sort of a boat centering apparatus. U.S. Pat. Nos. 3,447,815 and 4,268,211 have spring loaded roller members for contacting the sides of a boat. U.S. Pat. No. 2,827,304 has rotatable guide members 6C and 7C adapted to engage the sides of the bow of the boat as it is pulled onto the rear end of the trailer. U.S. Pat. No. 4,209,279 has a guide member 66 which appears to engage the hull and are separated as the ship comes on due to the increasing width of the hull.

SUMMARY OF THE INVENTION

This invention concerns a boat trailer with a boat guide for centering the boat as the boat is driven on the back of a trailer which is partially submerged in water. The guide member is more or less an inverted Umember with two upright posts with a cross-member across the top. The crossmember has a V-shaped member or cradle with a roller therein for receiving the keel of the boat. The guide member is positioned at the rear of the boat trailer with one post on one side and the other on the other side. The posts are rotatably mounted so they can rotate from a position essentially perpendicular to the bed of a trailer to being flat on the bed by forward rotation. Resilient means such as springs hold the guide member in an upright position until forced to rotate by the force of the boat being loaded.

In operation, when a boat is to be loaded onto the trailer, the trailer is backed down a ramp into the water so that essentialy most of the bed of the trailer is covered with water but the top of the guide member or at least the cross-member is above the water. The driver of the boat directs the bow of the boat so that the keel enters the V-shape which holds the boat on course. As the boat goes in farther toward the trailer, the V-shaped cradle follows along the keel in an aft direction and the keel will be maintained in the center of the trailer. As the boat goes up over the trailer, the cross-member of the guide will be forced down toward the bed of the trailer.

It is thus an object of this invention to provide a system for guiding a boat from the water onto a boat trailer so as to center the boat on the trailer as it is loaded.

BRIEF DESCRIPTION OF THE DRAWINGS

FIG. 4 illustrates a view along the line 4—4 of FIG. 3.

FIG. 6 illustrates a view along the line 6—6 of FIG. 4.

FIG. 7 illustrates a side view of a trailer having a fixed keel receiving V-notch secured to the frame.

FIG. 8 is a view taken along the line 8—8 of FIG. 7.

DETAILED DESCRIPTION OF THE PREFERRED EMBODIMENT

Figures 1, 2:
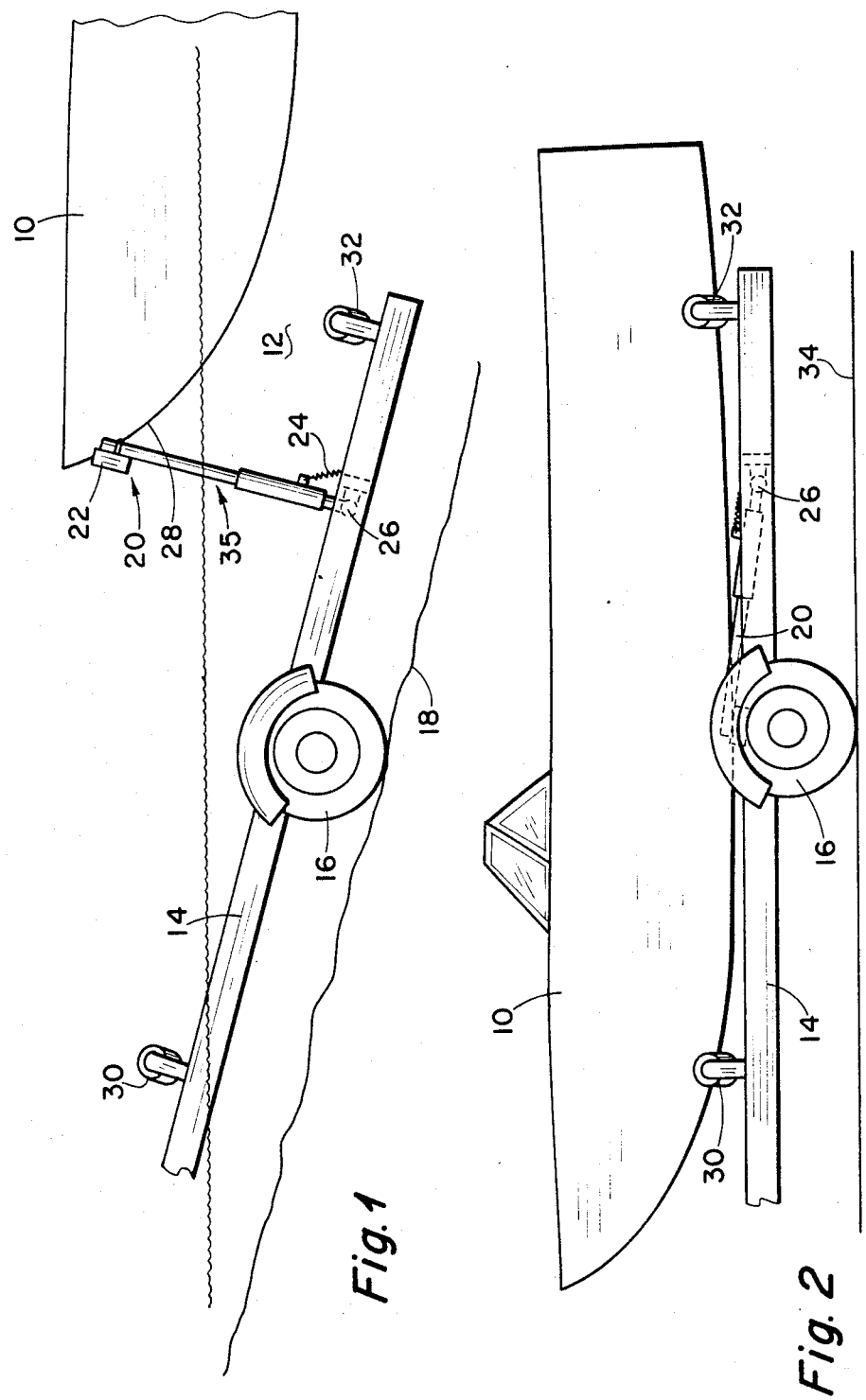
FIG. 1 shows a boat being loaded onto a boat trailer with my invention secured thereto.
FIG. 2 shows the boat of FIG. 1 loaded onto the trailer.

Attention is first directed to FIG. 1 which shows a boat 10 floating on a body of water 12 and being directed toward a boat trailer having a frame or bed 14. Frame 14 is supported by wheels 16 from a ramp 18 which is directed down from the dry land to below the surface of the body of water 12. These ramps are very frequently sloping concrete surfaces. Frame 14 is provided with forward roller boat support 30 and rear roller boat supports 32. Roller boat supports for receiving boats are well known and no detailed description will be made of these. FIG. 1 shows a boat trailer with my invention attached thereto. This includes a guide 20 which has a cradle or V-shaped nest 22 for receiving the bow of boat 10. Post 35 supports the guide and is connected by pivots 26 to the frame 14. A spring 24 urges the post into the upright position which as shown in FIG. 1 is essentially perpendicular to the bed or frame 14. As can be seen in the FIGS. 5 and 6, the volley or apex of the V-notch is in a direction parallel to the axis of posts 38 and 36.

As shown in FIG. 2, the boat has been moved completely upon the frame 14 and is supported thereon by front rollers 30 and rear or stern rollers 32. As can be seen, the guide 20 has been pivoted on pivot 26 to a nearly horizontal position.

Figure 5:
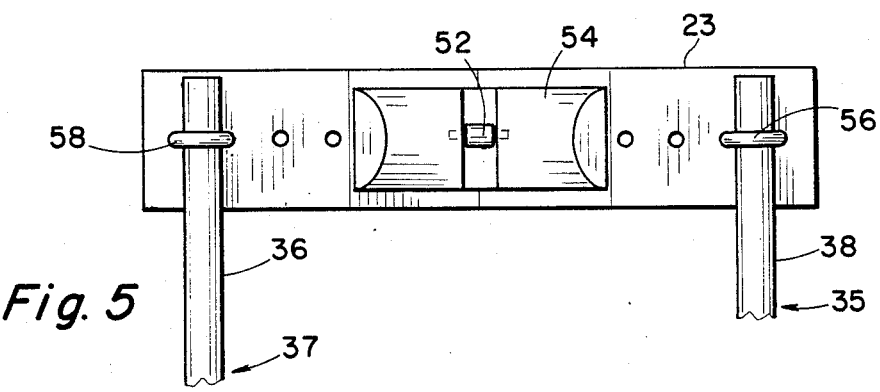
FIG. 5 illustrates a view along the line 5—5 of FIG. 3.
Figure 3:
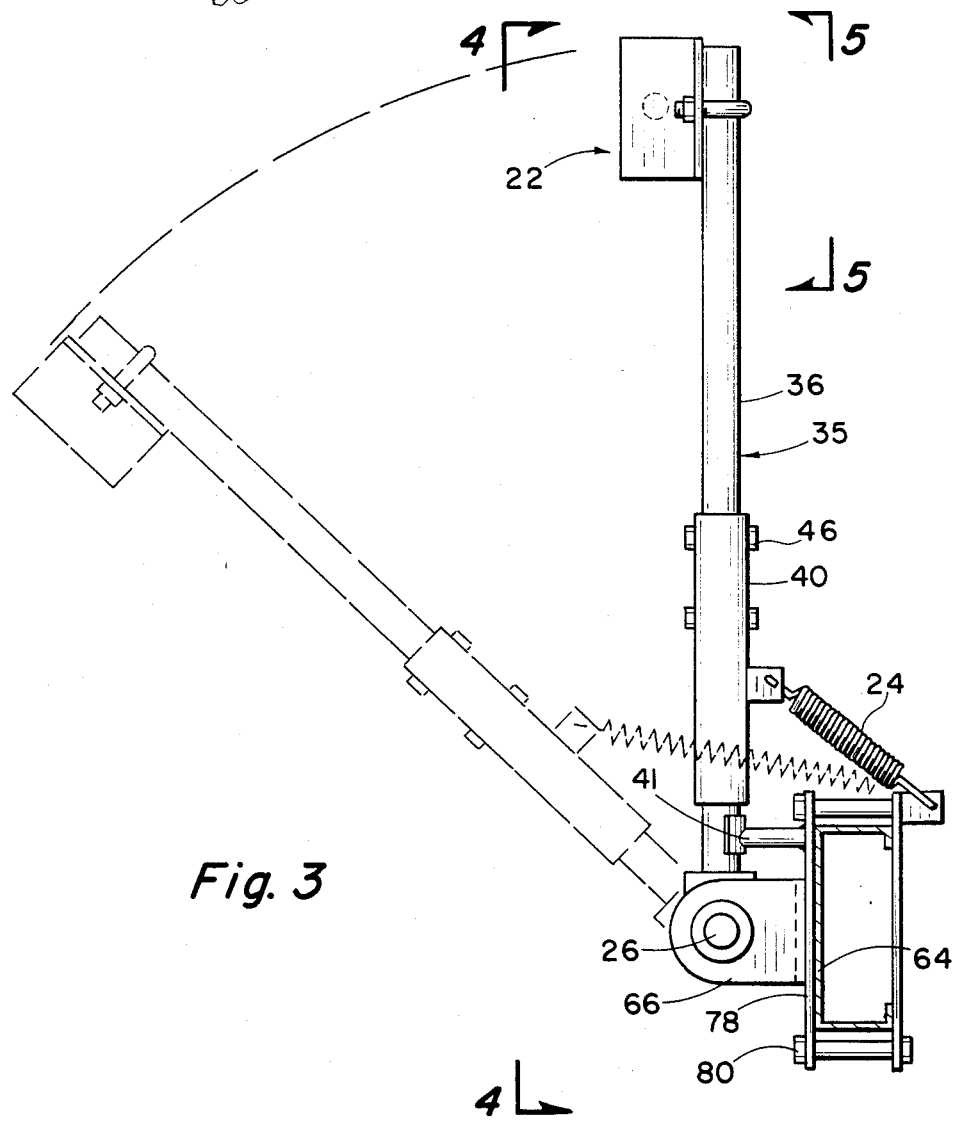
FIG. 3 illustrates a side view of my guide system.

Attention is next directed to FIGS. 3 and 4 which shows upright post 35 and upright post means 37. Post means 35 is pivotally mounted to one side of the trailer frame near the rear and the post means 37 is mounted on the opposite side. A cross-member 23 connects the upper end of post means 35 and 37. This takes on the form of a square inverted "U". Upright post means 35 includes an upper rod 36 which extends into cylinder 40 and is secured therein by bolts 46. The lower end of cylinder 40 is connected to a Tee 74 by rod 39. Rod 36 has holes 44 which are aligned in any desired manner with holes in cylinder 40 to obtain the desired height of the post. A shaft 76 extends from Tee 74 through ears 66 and 68 which are affixed to plate 78 which is secured by bolts 80 to cross frame member 64 which is a part of the frame 14. A spring 24 biases the post 36 to an upright position as shown in FIG. 3. A stop 41 is preferably used to limit the movement of post 36 toward the rear or stern of the boat. Post 37 is essentially identical to post 35 and is clearly shown in FIG. 4. Post 37 has a rod 38 with holes 4 and extends into cylinder 42. A bolt or pin 51 holds the rod 38 in the desired position. Cylinder 42 is connected to rod 41. Rod 41 is connected to a Tee 75 which is held between ears 70 and 72 similarly as it T-74. There is a series of holes 44 in rod 36 and corresponding holes in cylinder 40. Thus, the height of crossmember 23 can be adjusted by selecting the proper holes 44 and 48 and putting the pins 46 and 50 in the holes as to obtain the desired height of cross-member 23 above the frame. This will permit the accomodation of different size boats and the slope of the load ramp. As shown in FIG. 5, the upper ends of rods 36 and 38 are held to crossmember 23 by U-bolts 56 and 58 which as shown in FIG. 4 are connected by nuts 60 and 62. The boat cradle is shown clearly in FIGS. 4 and 5. It includes a V-shaped guide 50 supporting a roller 52 in the bottom of the "V". A "padding" material 54 is on the side of the "V" guide 50 and is of material which is firm but at least partially resilient so as not to damage the keel of the boat as the boat is being loaded.

Attentiion is next directed to FIG. 7 which shows a slight modification of my embodiment previously described. Shown thereon, I have positioned the main guide 20A at the extreme rear of the trailer frame. This is essentially the same pivot guide means as shown in FIG. 3 except for the position on the trailer. I also position a V-shaped permanent guide in front of wheel 16. This guide is quite similar to that V-guide shown in FIG. 6. In order to describe the fixed cradle, attention is directed to FIG. 8 which shows a cross-frame member 84 supported by brackets 86 and bolts 88 from frame 90 which may be the side trailer frame. There is a similar bracket 86A connected to frame 90A by bolt means 88A which are on the opposite side of the trailer. Crossframe 84 is provided with a cradle or V-shaped nest 92 for receiving the boat keel. This V-guide 92 includes a roller 93 supported in a notch 94 which is of the width to receive the keel which will be used with this boat trailer. The depth of the notch is such that it will help prevent the keel from moving from side to side when the boat reaches the position where the fixed keel is located. The V-guide 92 of FIG. 8 can be moved either fore or aft of the position shown in FIG. 7 merely by loosening the bolts 88 and moving it one way or the other and then tightening the bolts.

FIG. 3 shows the position of upright post 35 when the boat is in the position shown in FIG. 1. The broken line image of the guide in FIG. 3 shows post 35 as it is being rotated about pivot 26 as the boat is coming more and more over the trailer. In operation, the boat, as shown in FIG. 1, is directed toward the cradle 22 which is above the water with the "V" or cradle facing the boat and is easily visible to the driver of the boat. When it is desired to remove boat 10 from the water 12, one backs the trailer 14 into the water into the position shown in FIG. 1. At this time, the posts 35 and 37 have been adjusted so that they will contact the keel of the boat 10 at the proper position above the water surface as the keel comes to be loaded. This height can be adjusted by proper insertion of bolts 46 and 50 into proper holes 44 and 48. The keel will then come into the V-guide 50 as shown in FIG. 6 and the keel itself will rest on roller 52. As the boat moves more toward the shore, the keel 22 will keep the bow of the boat in the center, i.e. along the longitudinal center line, of the trailer. As the boat comes on in, the guide 20 will pivot about pivot 26 and the rollers 52 of the V-guide 50 will follow along the keel of the boat with the bow of the boat still being centered above the trailer. As the boat moves forward, its keel will enter the V-guide 92 shown in FIG. 8. This will assist in guiding the boat and keeping it centered on the trailer. As the boat moves on toward shore, the bow will eventually be supported by roller boat support 30 and the stern portion of the boat will be supported by side rollers 32. During this time, the guide 20 will be rotated to the position shown in FIG. 2. The boat will then be secured to the frame as desired and will be ready to be towed behind a vehicle. One of the main features of my invention is that the cradle or nest 22 keeps the keel of the boat centered over the trailer. With that centered, it is very easy to have the boat continue over the trailer and be centered completely in the trailer.

While this invention has been described with a certain degree of particularity, it is manifest than many changes may be made in the details of construction in the arrangement of components without departing from the spirit and scope of the disclosure. It is understood that the invention is not limited to the embodiment set forth herein for purposes of exemplification, but is limited only by the scope of the attached claim or claims, including the full range of equivalency to which each element thereof is entitled.

What is claimed:

1. A boat trailer having a longitudinal center line from front to back which comprises:
    a trailer having a boat receiving frame and which has a front, a rear end, a first side and a second side spaced from said first side;
    only one set of posts consisting of a first post and a second post;
    first pivot means having an axis perpendicular to said longitudinal center line and connecting said first post to the first side of said frame toward the rear end thereof;
    second pivot means having an axis perpendicular to said longitudinal center line and connecting said second post to the second side of said frame near the rear end thereof;
    a first cross-member connecting the upper ends of said first and second posts;
    biasing means for continually urging said first and second posts about said first pivot means and said second pivot means, respectively, toward upright position with respect to said frame;
    a keel receiving cradle support by said cross-member.

2. A boat trailer as defined in claim 1 in which said cradle includes a V-shaped guide having two sloping sides and a roller having an axis and positioned between said sloping sides.

3. A boat trailer as defined in claim 2 in which said V-guide is provided with resilient material for receiving the bow of a boat.

4. A guide member as defined in claim 2 including a second cross-member between said first and second sides and having a V-guide with a roller, said roller having an axis having a direction parallel to the axis of the roller in said first cross member, said second cross member being fixed to said boat trailer.

5. A guide member for use with a boat trailer for loading a boat thereon which comprises:
    a first post means having a first end and a second end and an axis;

a second post means having a first end and a second end and an axis;

a cross-member fixedly attached to the first ends of each said post means to form a rigid U-like configuration;

a first pivot means and a second pivot means connected to the second ends of said first and second post means for rotating the post means only in spaced apart parallel planes;

said cross-member having V-guide with a roller, said roller being on an axis which is approximately 90° from the axis of said first and second post means.

6. A guide as defined in claim 5 in which each of said pivot means includes a plate means and a spring connecting said plate means to each of said post means, respectively.

7. A guide as defined in claim 6 in which said post means includes a cylinder with lateral holes therein and a rod having holes therein and telescopically insertable into said cylinder and a bolt for passing through the holes of said cylinder and said rod for adjusting the height thereof.

8. A guide as defined in claim 7 in which the valley of the V-notch is parallel to the direction of said post means and includes padding material in said V-notch.

9. A boat trailer as defind in claim 1 in which said first pivot means and said second pivot means each has a pivoting axis which permits rotation of said first post and second post only in parallel planes.

10. A boat trailer which comprises:
a trailer having a boat receiving frame and which has a front, a rear end, a first side and a second side;
a first post and a second post;
first pivot means connecting said first post to the first side of said frame toward the rear end thereof;
second pivot means connecting said second post to the second side of the frame near the rear end thereof;
said first pivot means and said second pivot means each has a pivoting axis which permits rotation of said first post and second post only in parallel planes;
a first cross member connecting the upper ends of said first and second posts;
biasing means for continuously urging said first post and said second post about said first pivot means and said second pivot means, respectively, to upright positions with respect to said frame;
a keel receiving cradle supported by such cross member.

11. A guide member for use with a boat trailer having a frame for loading a boat thereon which comprises:
a first post means having a first end and a second end and an axis;
a second post means having a first end and a second end and an axis;
a cross member connecting the first ends of each said post means to form a U-like configuration;
a first pivot means and a second pivot means connected to the second ends of said first and second post means, respectively, for rotating the first and second post means only in spaced apart parallel planes;
said cross member having a V-guide with a roller, said roller being on a axis which is approximately 90° from the axis of said first and second post means;
a spring connecting said post means to the frame of said boat trailer;
each said post means includes a cylinder with lateral holes therein and a rod having holes therein and telescopically insertable into said cylinder and a bolt for passing through the holes of said cylinder and said rod for adjusting the height thereof.

12. A guide as defined in claim 11 in which the V-guide includes padding material therein and has a valley which runs parallel to each of said post means.

* * * * *